Aug. 26, 1969  H. J. LESKIEWICZ ET AL  3,463,442
MULTI-INPUT DIAPHRAGM LOGIC ELEMENT
Filed July 28, 1966  3 Sheets-Sheet 2

Aug. 26, 1969  H. J. LESKIEWICZ ET AL  3,463,442
MULTI-INPUT DIAPHRAGM LOGIC ELEMENT
Filed July 28, 1966  3 Sheets-Sheet 3
Fig. 3a 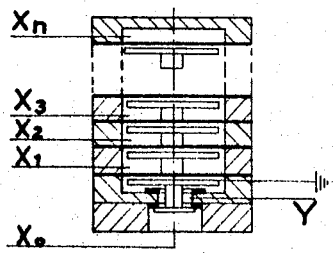  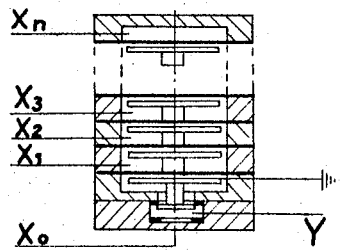 Fig. 3b
$Y = X_0 (X_1 + X_2 + X_3 + \ldots X_n)$   $Y = \overline{X_0 (X_1 + X_2 + X_3 + \ldots X_n)}$
Fig. 3c 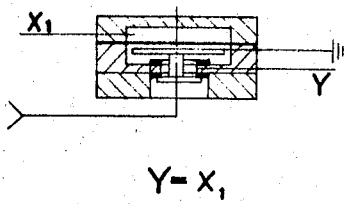  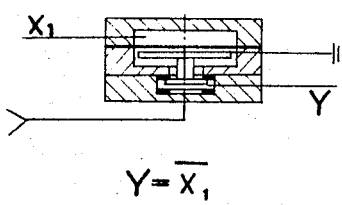 Fig. 3d
$Y = X_1$   $Y = \overline{X_1}$
Fig. 3e 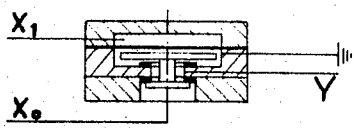  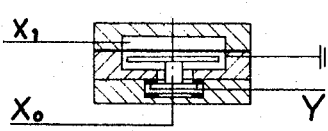 Fig. 3f
$Y = X_0 X_1$   $Y = X_0 \overline{X_1}$
Fig. 3g 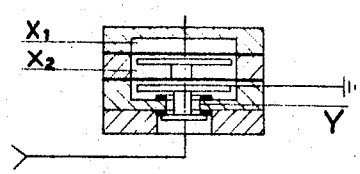  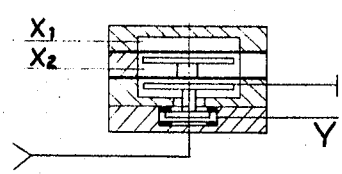 Fig. 3h
$Y = X_1 + X_2$   $Y = \overline{X_1 + X_2}$ United States Patent Office 3,463,442
Patented Aug. 26, 1969

3,463,442
MULTI-INPUT DIAPHRAGM LOGIC ELEMENT
Henryk J. Leskiewicz, Chadkiewicza 4 m 10, Jan Jacewicz, Madalinskiego 102 m 26, and Mariusz Olszewski, Al. Ujazadowskie 39 m 19, all of Warsaw, Poland
Filed July 28, 1966, Ser. No. 568,628
Claims priority, application Poland, Aug. 3, 1965, P 110,325; Apr. 4, 1966, P 113,868
Int. Cl. F16k 31/385; G06d 1/02
U.S. Cl. 251—61.2   8 Claims

ABSTRACT OF THE DISCLOSURE

Logic element in which coupling of supply pressure to an output channel is controlled by a switching element, which closes or opens a hole in a seat under the control of a pusher in turn controlled by the cooperative action of a number of aligned pushers positioned in respective chambers.

The invention relates to a multi-input diaphragm logic element adapted for use in regulation and control systems.

Diaphragm logic elements operating in a standard range of pressures can be used in connection with existing pneumatic governors, transducers, and various executing elements and analogs devices. Their main advantages are their small dimensions, a remarkable durability and reliability, and short switching time. These characteristics make it possible to connect them into many regulation and control systems, and also to use them to replace known logic systems composed of electromagnetic or electronic relays.

In known designs, diaphragm logic elements are provided with a set of diaphragms, which move, under the action of control pressures, control ball valves and so varies an input signal according to these pressures. On the one hand, this renders it possible to fix a switching point according to suitable choice of the ratio of values of input pressures and holding pressures, but on the other hand it leads to the necessity of using additional pressures thereby diminishing the possibility of realizing logic functions by means of one element for functions of both single and multiple independent variables. Other known designs are based upon a construction with a single diaphragm directly or indirectly controlling valves controlling the output signal. These elements do not functionally differ from conventional relays, and require several elements to work with several variables. Although their construction is rather simple, they are not free from disadvantages, namely lack of fixed switching point, a steady consumption of air and long switching time, owing to use of resistance elements.

The invention will next be described with reference to the attached drawings, wherein;

FIGS. 3a–3h show diagramatically in section various modifications of the logic element to carry out different functions.

Figure 1:
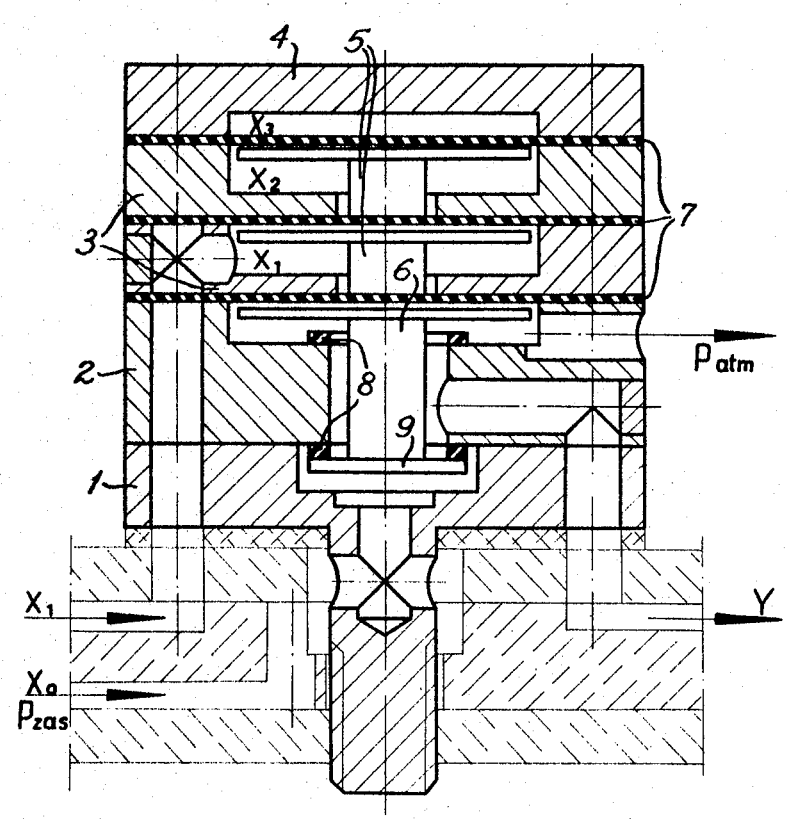
FIG. 1 is a cross section of a multi-input diaphragm logic element according to the invention.
Figure 1A:
FIG. 1a shows a portion of a modified version of such element.
Figure 2:
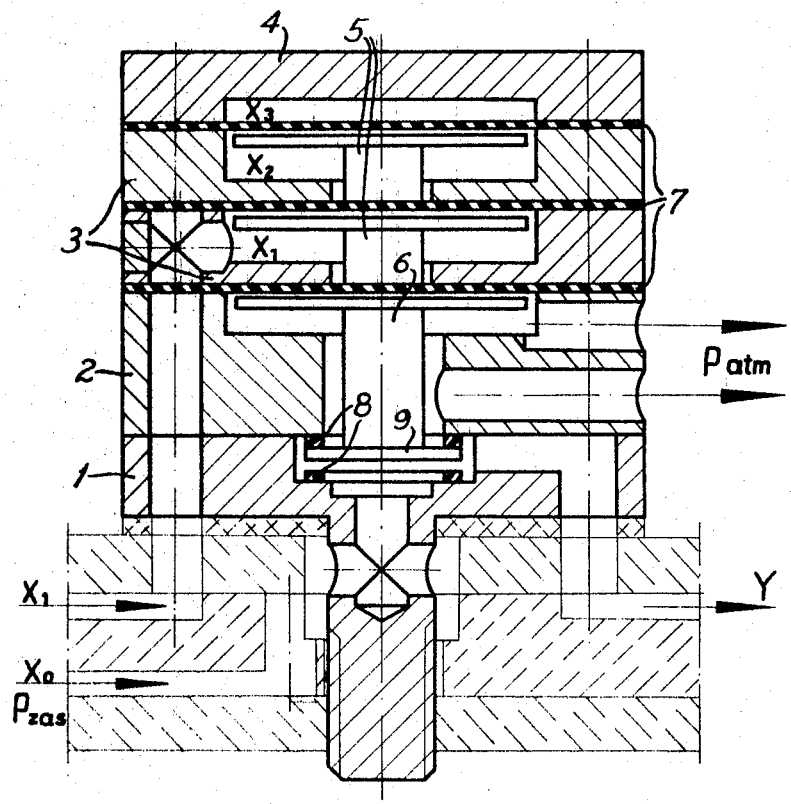
FIG. 2 is a cross section of another embodiment of a diaphragm logic element.

The multi-input diaphragm logic element according to the invention is constructed in two principal ways, i.e.: a multi-input alternative element as shown in FIG. 1 and the modified versions in FIG. 1a, and a multi-input negation element as shown in FIG. 2. The element is composed of a base or stand 1, a segment 2, one or more rings 3 and a cover 4. Each such element comprises one each of parts 1, 2 and 4, and $n-1$ rings 3, where $n$ is the number of input signals. The element consists, moreover, of $n-1$ intermediate pushers or plungers 5, of a direct pusher or plunger 6 and of $n$ flexible diaphragms 7. The position of sealing ring 8 of the switching element 9 and of an output channel, determines the reproduction or negation function of the individual element.

Passing the pressure signal $x_n$ to any one chamber, defined by the diaphragms and rings, causes a deflection of the corresponding diaphragm and, by means of the intermediate pusher or pushers, the motion of the direct pusher 6. As shown in the modification in FIG. 1a, the direct pusher 6 is biased by spring 10 which fixes the value of switch pressure. The pusher 6, in an alternative element, rests upon the sealing ring 8 of the segment 2 closing the connection of the output $y$ with the ambient atmosphere and pushes the switching element 9 connecting the output with the channel of the feed pressure $p_{zas}$. In a negation-alternative element, the direct pusher 6 pushes the switching element 9 until it abuts the sealing ring 8 of the stand 1, wherewith it closes the channel of the feed pressure and connects the output $y$ with the ambient atmosphere.

From the above description it follows that a multi-input alternative element realizes a function of several variables $y=x_1+x_2+ \ldots +x_n$, and a multi-input negation-alternative element a function $y=\overline{x_1+x_2+ \ldots +x_n}$. Using the channel of the feed pressure to lead in an additional input signal $x_0$, as is shown in FIG. 3a, enables realizing a function $y=x_0/x_1+x_2+ \ldots +x_n/$, or as is shown in FIG. 3b, a function $y=x_0/\overline{x_1}+\overline{x_2}+ \ldots +\overline{x_n}/$. Based on the dependence noted above, methods are obtained to realize basic logic functions: reproduction $y=x_1$, shown in FIG. 3c; negation function $y=\overline{x_1}$, shown in FIG. 3d; conjunction function $y=x_0x_1$, shown in FIG. 3e; negation-implication function $y=x_0\overline{x_1}$, shown in FIG. 3f; alternative function $y=x_1+x_2$, shown in FIG. 3g; and negation-alternative function $y=\overline{x_1+x_2}$, shown in FIG. 3h.

Individual parts of elements of the invention can be made of different materials and with various technological practices.

When assembling systems of elements in accordance with the specified invention, they may be joined by means of plates with printed pneumatic circuits or by means of pneumatic conduits. The elements installed by means of printed circuits may be screwed in, fastened with screws, glued down or joined with plates by other means, whereby the outputs of lead-in channels contact immediately or through a sealing plate with channels made in plates, as is shown in FIGS. 1 and 2.

Working agents for elements of the specified invention may be fluids or gases.

In comparison with hitherto known multi-input arrangements, a diaphragm logic element of the invention has a number of essential and new advantages. One of the most important is the possibility of realizing logic functions of several variables by using a single element. This enables simplifying the construction of a system of logic elements significantly. A second advantage is a very simple construction of elements realizing the basic logic functions. This is strongly connected with new structural features such as avoiding of a set of diaphragms, fixing the switching point, possibility of simple joining the elements with printed circuits and lack of resistance elements. A substantial advantage is also the reproductibility of component parts of both versions of the element and a possibility of applying different materials and various technological methods of production to the elements.

Multi-input diaphragm logic elements find their application possibilities in different industries such as in chemical, food, petrochemistry, machine tool industry, etc.

What we claim is:

1. A logic element for handling $n$ input signals, said element comprising a base part having input channels for the admission of an input supply pressure and $n$ input pressures and an output channel for the transmission of an output pressure, a segment part mounted on said base part, a direct pusher displaceably accommodated in said segment part, one of said parts including a seat with an opening coupling the supply pressure with the output channel, said direct pusher being adapted for selectively obturating the opening in said seat, $n-1$ rings provided with respective and adjacent chambers coupled to $n-1$ of said input pressures and mounted on said segment part, a cover on said rings having a chamber coupled to the remaining input pressure, diaphragms between the said chambers, and intermediate pushers between the diaphragms and aligned with each other and with said direct pusher to control the latter upon being subjected to the input pressures via the diaphragms.

2. A logic element as claimed in claim 1 comprising means normally and yieldably maintaining the direct pusher in position to obturate the opening in said seat.

3. A logic element as claimed in claim 1 comprising means normally and yieldably maintaining the direct pusher in position whereby the opening in said seat is open.

4. A logic element as claimed in claim 1 wherein the direct pusher includes a switching element which obturates said opening.

5. A logic element as claimed in claim 1 comprising a spring biasing the direct pusher.

6. A logic element as claimed in claim 1 wherein the pushers are coaxially aligned and the intermediate pushers are separate from each other and from the direct pusher.

7. A logic element as claimed in claim 1 wherein the segment part is further provided with an opening to ambient atmosphere.

8. A logic element as claimed in claim 1 wherein only one of said intermediate pushers is located to engage said direct pusher.

References Cited

UNITED STATES PATENTS

| 2,947,320 | 8/1960 | Oxley et al. | 251—367 X |
| 3,292,853 | 12/1966 | Fedoseev | 235—200 |
| 3,303,999 | 2/1967 | Mamy | 235—201 |
| 3,335,950 | 8/1967 | Tal et al. | 235—201 |

FOREIGN PATENTS

| 774,795 | 5/1957 | Great Britain. |

ARNOLD ROSENTHAL, Primary Examiner

U.S. Cl. X.R.

137—625.66; 235—200